US011814982B2

(12) United States Patent
Mallat-Desmortiers et al.

(10) Patent No.: US 11,814,982 B2
(45) Date of Patent: Nov. 14, 2023

(54) VANE FOR AN AIRCRAFT TURBINE ENGINE

(71) Applicant: SAFRAN AIRCRAFT ENGINES, Paris (FR)

(72) Inventors: Jean-Philippe Mallat-Desmortiers, Moissy-Cramayel (FR); Peter Shamma Jeanty, Moissy-Cramayel (FR); Eric Jacques Delcoigne, Moissy-Cramayel (FR); Edouard Emmanuel Garreau, Moissy-Cramayel (FR); Thomas Tsassis, Moissy-Cramayel (FR); Samuel Laurent Noël Mathieu Juge, Moissy-Cramayel (FR); Lucas Geoffrey Desbois, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/797,287

(22) PCT Filed: Jan. 28, 2021

(86) PCT No.: PCT/FR2021/050162
§ 371 (c)(1),
(2) Date: Aug. 3, 2022

(87) PCT Pub. No.: WO2021/156559
PCT Pub. Date: Aug. 12, 2021

(65) Prior Publication Data
US 2023/0057555 A1  Feb. 23, 2023

(30) Foreign Application Priority Data

Feb. 7, 2020 (FR) ..................................... 2001224

(51) Int. Cl.
*F01D 5/14* (2006.01)
*F01D 5/16* (2006.01)

(52) U.S. Cl.
CPC ............... *F01D 5/142* (2013.01); *F01D 5/16* (2013.01); *F05D 2260/96* (2013.01)

(58) Field of Classification Search
CPC ... F01D 5/12; F01D 5/14; F01D 5/141; F01D 5/142; F01D 5/16; F01D 5/22;
(Continued)

(56) References Cited

U.S. PATENT DOCUMENTS 6,491,498 B1   12/2002  Seleski et al.
2013/0259699 A1*  10/2013  Collin .................... F01D 5/225
                                                               416/224

(Continued)

FOREIGN PATENT DOCUMENTS

FR   2 967 714 A1   5/2012
FR   2 985 759 A1   7/2013
(Continued)

OTHER PUBLICATIONS

International Search Report dated Apr. 13, 2021, issued in corresponding International Application No. PCT/FR2021/050162, filed Jan. 28, 2021, 6 pages.
Written Opinion dated Apr. 13, 2021, issued in corresponding International Application No. PCT/FR2021/050162, filed Jan. 28, 2021, 5 pages.
English translation of Written Opinion dated Apr. 13, 2021, issued in corresponding International Application No. PCT/FR2021/050162, filed Jan. 28, 2021, 4 pages.
(Continued)

*Primary Examiner* — Elton K Wong
(74) *Attorney, Agent, or Firm* — CHRISTENSEN O'CONNOR JOHNSON KINDNESS PLLC

(57) ABSTRACT

A rotor vane for an aircraft turbine engine includes a blade extending between an inner platform and an outer platform which carries at least one projecting lip. The blade has a lower surface and an upper surface, and the outer platform includes, on the side of the lower and upper surfaces, lateral edges configured to cooperate in a form-fitting manner with
(Continued)

complementary lateral edges of adjacent vanes. Each of the lateral edges has an anti-wear coating, and one of the lateral edges forms a hollow tip (P) with a bowl configured to receive the coating and further including a first concave cylindrical surface portion, the geometric dimensions of which are optimized to limit the risk of cracks appearing when the coating is applied.

10 Claims, 6 Drawing Sheets

(58) Field of Classification Search
CPC ...... F01D 5/225; F01D 11/005; F01D 11/006; F01D 11/08; F05D 2240/80; F05D 2260/96
See application file for complete search history.

(56) References Cited

U.S. PATENT DOCUMENTS

| | | | |
|---|---|---|---|
| 2015/0211372 A1* | 7/2015 | Wilson | F01D 5/147 164/76.1 |
| 2018/0016918 A1* | 1/2018 | Skura | F01D 11/003 |
| 2018/0347380 A1* | 12/2018 | Patel | F01D 5/288 |
| 2019/0309638 A1 | 10/2019 | Loisel et al. | |

FOREIGN PATENT DOCUMENTS

| | | |
|---|---|---|
| FR | 3 077 600 A1 | 8/2019 |
| WO | 2014/118456 A1 | 8/2014 |

OTHER PUBLICATIONS

International Preliminary Report on Patentability dated Jul. 28, 2022, issued in corresponding International Application No. PCT/FR2021/050162, filed Jan. 28, 2021, 6 pages.

* cited by examiner

VANE FOR AN AIRCRAFT TURBINE ENGINE

TECHNICAL FIELD OF THE INVENTION

The present invention relates to the general field of the vanes for an aircraft turbine engine.

TECHNICAL BACKGROUND

The technical background comprises in particular the documents FR-A1-3 077 600, U.S. Pat. No. 6,491,498, WO-A1-2014/118456, FR-A1-2 967 714 and US-A1-2019/309638.

Classically, an axial turbine of a turbine engine is composed of a succession of axial stages (along the axis of flow of the gas flows) arranged in series. Each stage comprises a movable wheel with vanes forming rotor and a bladed dispenser forming stator. The movable wheel is rotated opposite the corresponding dispenser.

In the present application, upstream and downstream are defined with respect to the normal direction of the air flows (from upstream to downstream) through the turbine engine. The axis of rotation of the main rotor of the turbine engine is referred to "axis of the turbine engine". The axial direction corresponds to the direction of the axis of the turbine engine, and a radial direction is a direction perpendicular to the axis of the turbine engine and intersecting that axis. Similarly, an axial plane is a plane containing the axis of the turbine engine, and a radial plane is a plane perpendicular to that axis. The adjectives "inner" and "outer" are used in reference to a radial direction so that the inner portion of an element is, along a radial direction, closer to the axis of the turbine engine than the outer portion of the same element. The stacking axis of a vane is the axis perpendicular to the axis of the turbine engine, which passes through the centre of gravity of the innermost section of the blade of the vane (i.e., the section closest to the axis of the turbine engine). Typically, a turbine engine vane comprises a blade extending along the stacking axis of the vane, between the proximal and distal (i.e., inner and outer) ends of the vane.

The movable wheel typically consists of an annular disc centred on the axis of rotation of the wheel, to which a plurality of vanes is attached.

An example of a vane is shown in FIG. 1. A vane of this type is described in the document FR-A1-2 985 759. This vane 10 comprises a blade 16 extending along the stacking axis X of the vane, between the proximal 10A and distal 10B ends of the vane 10. At its proximal end 10A, the vane comprises a platform 19 and a root 12 by which it is attached to the disc (not shown). At its distal end 10B, the vane 10 has a stub 14. When several vanes 10 are attached on the disc, their stubs 14 are arranged edge to edge so as to form a circumferential ring delimiting a surface of revolution about the axis A of rotation of the wheel. This ring has the function, in particular, of delimiting the outer surface of the flow duct of the gas flows circulating between the blades 16 and of limiting the gas leaks at the level of the distal end 10B of the vanes 10.

The stub 14 comprises a platform 20 externally delimiting the flow duct of the gas flowing between the blades 16, and having opposite lateral edges 21, 22. The platform 20 comprises an upstream portion 24 referred to as "upstream spoiler" and a downstream portion 28 referred to as "downstream spoiler". The stub 14 also comprises upstream 31 and downstream 32 sealing wipers extending radially outward from the outer face of the platform 20. These wipers have a general circumferential or transverse orientation with respect to the axis of rotation of the wheel. Each of the lateral edges 21, 22 of the platform has, between the upstream 31 and downstream 32 wipers, a substantially "Z" profile.

When several vanes 10 are attached on the disc, the upstream 31 and downstream 32 wipers are arranged edge to edge so as to form a rotating annulus of axis A, this annulus being contained substantially in a radial plane. One of the functions of such an annulus is in particular to limit the clearance between the vanes 10 and a casing (not shown) that surrounds the vanes 10 in order to limit gas leaks at this point. This casing has an abradable annular coating which can cooperate by friction with the wipers of the vanes in order to limit these leaks by labyrinth effect.

In order to dampen the vibrations to which the vanes 10 are subjected during operation, the vanes 10 are mounted on their disc with a torsional stress about their stacking axis X. The geometry of the stubs 14 is such that each vane 10 is put under torsional stress by bearing on the neighbouring vanes 10 mainly along a lateral face 34 of the intrados portion of the upstream wiper 31 and a lateral face of the extrados portion of the upstream wiper 31 of the neighbouring vane 10. The lateral faces 34 define inter-vane contact surfaces and are the location of significant friction during operation of the turbine engine. To protect against wear, the lateral faces 34 are provided with a coating or insert made of friction-resistant material. For example, it may be a material marketed under the name Stellite. This anti-wear coating 36 is best seen in FIG. 2.

Typically, this anti-wear coating 36 is deposited on the lateral faces 34 by welding, for example by drop welding, involving the creation of an electric arc to melt the material. This is often a manual operation, as the alloy of the Stellite® type is in the form of a liquid drop during deposition.

The Stellite® alloy is a high chromium (Cr) and cobalt (Co) content steel alloy. It may also contain a small amount of tungsten (W) or molybdenum (Mo) and a small amount of carbon (C). The Stellite® alloy is not forgeable and must be either cast or welded onto an object of which it forms a portion or into which it is inserted.

The lateral edges of the external platform of a vane are configured to cooperate in a form-fitting manner with the complementary lateral edges of adjacent vanes, and each comprise an anti-wear coating of the type mentioned above.

In one particular embodiment, one of the lateral edges forms a hollow tip P and is configured to receive a protruding tip from one of the lateral edges of an adjacent vane. This hollow tip P comprises a bowl 38 for receiving the anti-wear coating 36. This hollow tip P further comprises a first concave cylindrical surface segment 40 that is formed partly in the external platform 20 and partly in a low wall 42 that projects from that platform and is connected to the wiper 31 (FIG. 2).

In this configuration, the deposition of the anti-wear coating 36 is very problematic. Indeed, with the current technique, the Stellite® deposition operations via welding result in cracks close to the Stellite®, which are unacceptable and increase the vane scrap rate. This is due to several reasons: coatings are located in geometric confinements that make the welding operation difficult (access and reduced visibility). Moreover, a very local heat input in a geometrically confined area results in significant local constraints. Finally, the welding operation is manual, which makes it very dependent on human factors.

There is therefore a need for this type of configuration to limit the number of cracks when depositing Stellite® in a hollow tip, by providing geometric recommendations for the design of the vane. These recommendations should make the geometry more robust without being too massive in order to optimize the vane.

The present invention proposes an improvement to this technology, which provides a simple, effective and economical solution to this problem.

SUMMARY OF THE INVENTION

The present invention proposes a rotor vane for an aircraft turbine engine, this vane having an axis of rotation once it is secured to a rotor and a stacking axis and comprising a blade extending along the stacking axis between an internal platform and an external platform which bears at least one projecting wiper, said blade comprising an intrados and an extrados and said external platform comprising, on the side of said intrados and extrados, lateral edges configured to cooperate in a form-fitting manner with complementary lateral edges of adjacent vanes, these lateral edges each comprising an anti-wear coating, one of these lateral edges forming a hollow tip comprising a bowl for receiving said coating and further comprising a first concave cylindrical surface segment formed partly in said external platform and partly in a low wall which projects from this platform and which is connected to said at least one wiper, this first surface segment extending along and about a virtual axis substantially parallel to said stacking axis, characterised in that:
said low wall has a thickness measured in a direction substantially perpendicular to said virtual axis, which is greater than or equal to 2.5 mm, and
said first surface segment has a height measured along said virtual axis, which is equal to at least 150% of the thickness of the low wall.

The invention thus proposes an optimization of geometric parameters of the concave cylindrical surface segment located in the hollow tip of the external platform of the vane. The abrupt geometry variations are eliminated at the level of this surface segment, thus allowing to reduce the risk of cracks in this area.

A simulation of Stellite® deposition allows to confirm the effectiveness of these recommendations. Indeed, by simulating a rise in the temperature at the level of the anti-wear coating, followed by a rapid cooling, we can see that the constraints in the hollow tip are much lower on a geometry with these recommendations: the constraints decrease on average by 35%.

The vane according to the invention may comprise one or more of the following characteristics, taken alone or in combination with each other:
said first surface segment has a radius measured with respect to said virtual axis, which is greater than or equal to 1.2 mm;
said first surface segment has a height measured along said virtual axis, which is greater than or equal to 3 mm,
said hollow tip comprises a second planar surface segment extending from said first surface segment on the opposite side of said at least one wiper to which said low wall is connected, said second segment being formed partly in said external platform and partly in said low wall, and extending substantially parallel to said virtual axis;
said external platform comprises a first surface connected to said blade, and a second opposite surface on which said low wall projects, this low wall comprising a head surface, opposite said blade, which extends from said at least one wiper to a first fillet connecting said head surface to said second surface;
said head surface is inclined with respect to said second surface by an angle less than or equal to 35';
said external platform carries two substantially parallel projecting wipers, said low wall extending from a first one of the wipers to a distance from a second one of the wipers, the cumulative distance of the low wall and said first fillet, measured from said first surface segment and along said second surface segment being at least 40% of the cumulative distance of the low wall, of said first fillet and of said second surface of the platform to a second fillet connecting this second surface to the second wiper, these distances being measured from said first surface segment and along said second surface segment.

The present invention further relates to a rotor wheel for an aircraft turbine engine, comprising a disc carrying at its periphery an annular row of vanes as described above.

Advantageously, the lateral edges of the vanes are nested into one another and comprise anti-wear coatings bearing on one another, the vanes bearing on one another solely by means of their coatings.

The present invention also relates to an aircraft turbine engine, comprising at least one vane or a wheel as described above.

BRIEF DESCRIPTION OF THE FIGURES

Further characteristics and advantages of the invention will become apparent from the following detailed description, for the understanding of which reference is made to the attached drawings in which.

DETAILED DESCRIPTION OF THE INVENTION

Figure 1:
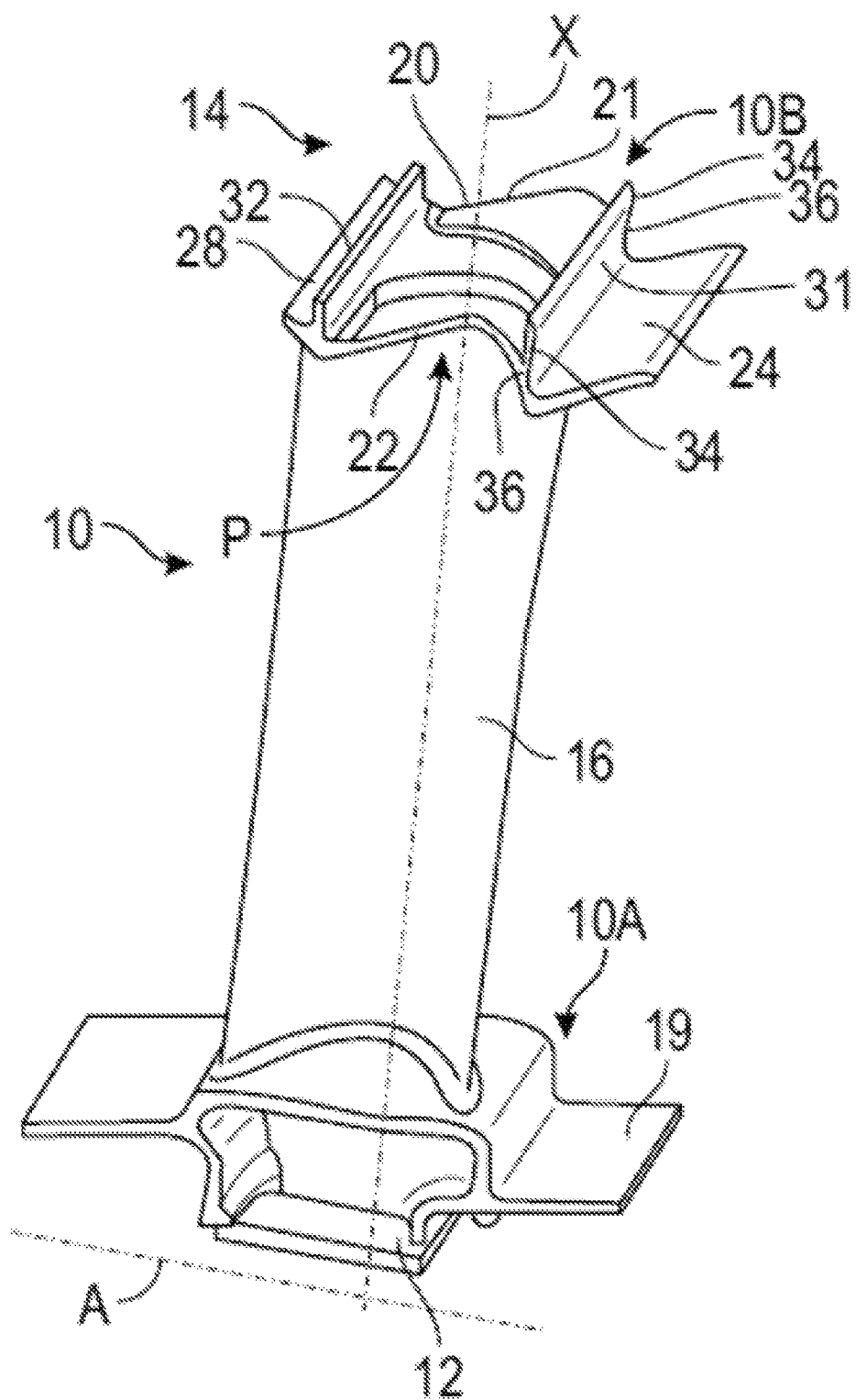
FIG. 1 is a schematic perspective view of a turbine wheel vane for an aircraft turbine engine.
Figure 2:
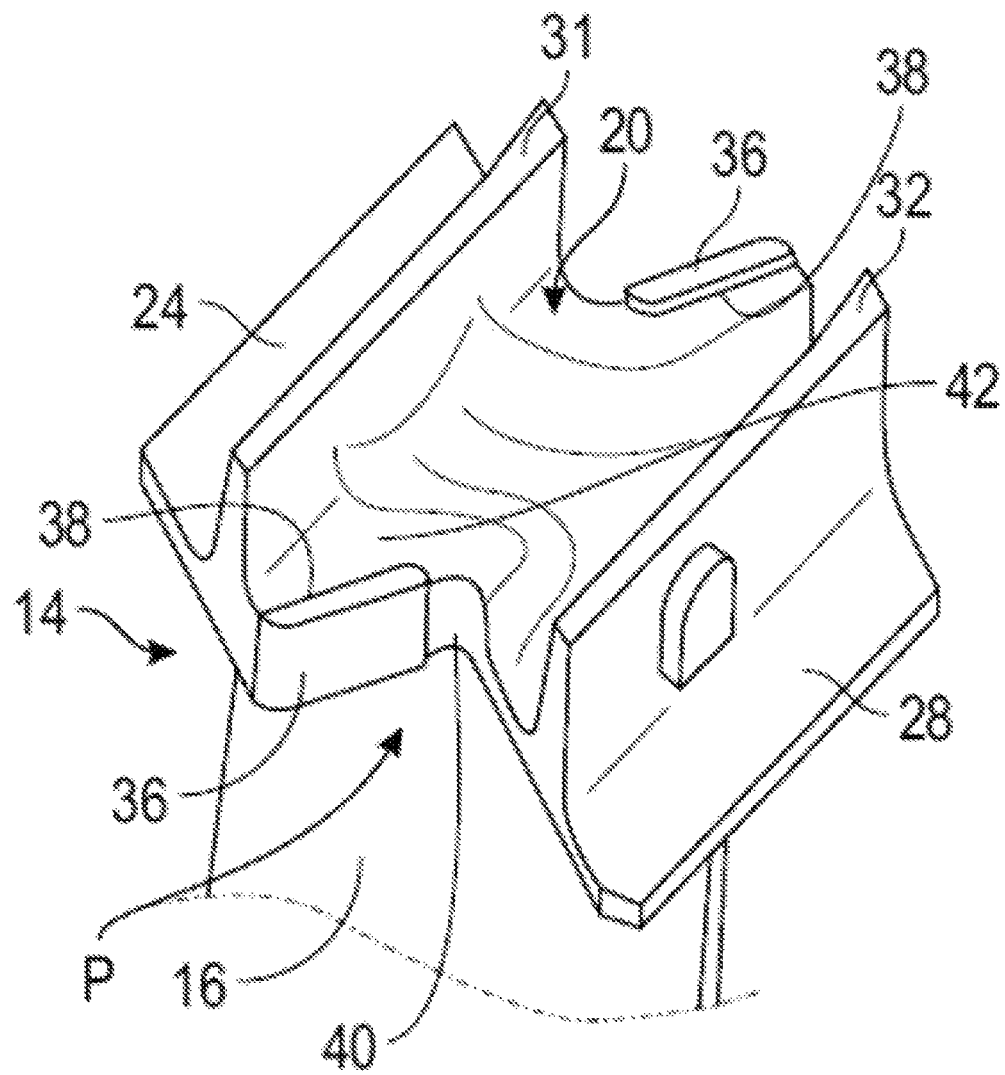
FIG. 2 is a larger scale schematic view of a portion of the vane in FIG. 1, FIGS. 3a to 3d are schematic detail views of an external platform of a rotor vane.

The invention applies to a vane 10 of movable wheel as described above with reference to FIGS. 1 and 2.

The vane 10 comprises at least one blade 16 that extends between two platforms, respectively internal 19 and external 20. The internal platform 19 is connected to the radially internal end of the blade and the external platform 20 is connected to the radially external end of the blade and comprises coatings 36 of anti-wear material.

FIGS. 3a to 3d illustrate details of a lateral edge 22 of a platform 20, and in particular that comprising a hollow tip P for receiving a protruding tip of the lateral edge 21 of an adjacent vane.

The elements of FIGS. 3a to 3d that have been described in the foregoing are designated by the same references in FIGS. 3a to 3d.

FIGS. 3a to 3d illustrate parameters that are relatively critical to the occurrence of cracks in the anti-wear coating 36 located in this hollow tip P. This coating 36 is schematically represented by a hatched area Z1 in FIG. 3a, and is located in a bowl 38 of this hollow tip P.

The inventors demonstrated that the geometric dimensions of a concave cylindrical surface segment 40 of the hollow tip P were important in reducing the appearances of cracking. This surface segment 40 is formed partly in the external platform 20 and partly in a low wall 42 that protrudes from this platform and is connected to the wiper 31. This surface segment 40 extends along and about a virtual axis Y substantially parallel to the stacking axis X.

Figures 3A, 3B, 3C, 3D:
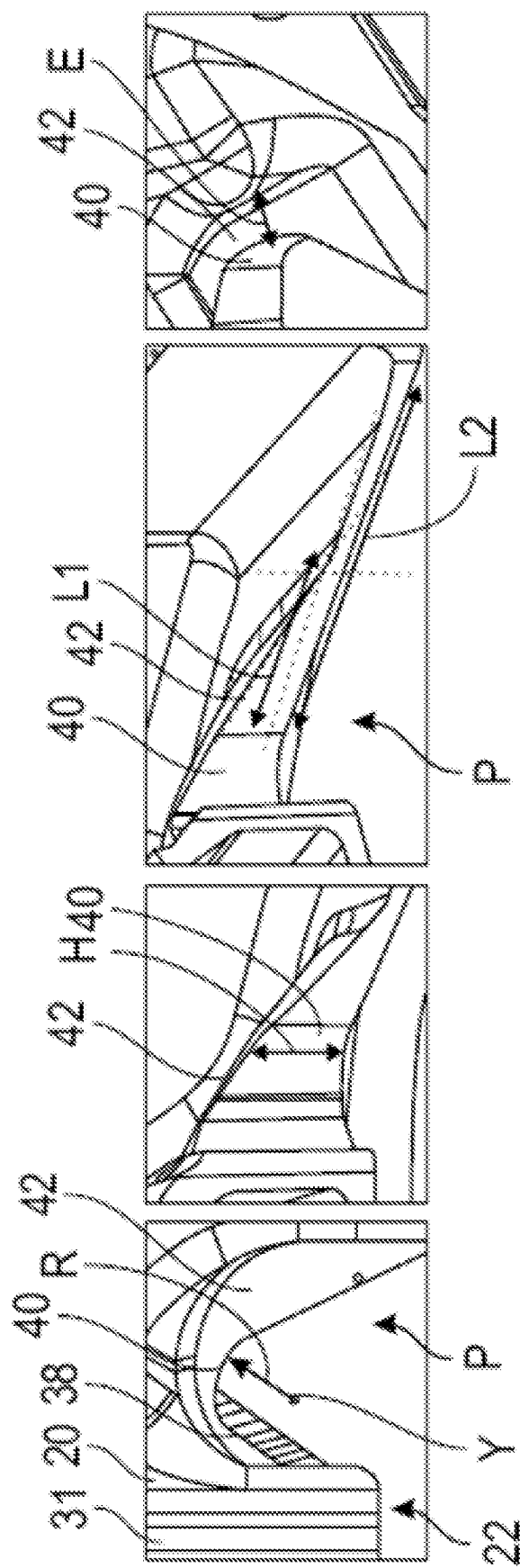

As shown in FIG. 3a, the surface segment 40 must have a radius R measured with respect to the axis Y that is greater than or equal to a certain value.

As illustrated in FIG. 3d, the low wall 42 should preferably have a thickness E measured in a direction substantially perpendicular to the axis Y, which is greater than or equal to a certain value.

As shown in FIG. 3b, the surface segment 40 must have a height H measured along the axis Y that is at least 150% of the thickness E of the low wall 42.

Finally, advantageously, as shown in FIG. 3c, the ratio L1/L2, which will be explained in the following, must be greater than or equal to a certain value.

FIGS. 4 and 5a to 5d illustrate an embodiment of a rotor vane according to the invention with the above parameters optimized.

Figure 4:
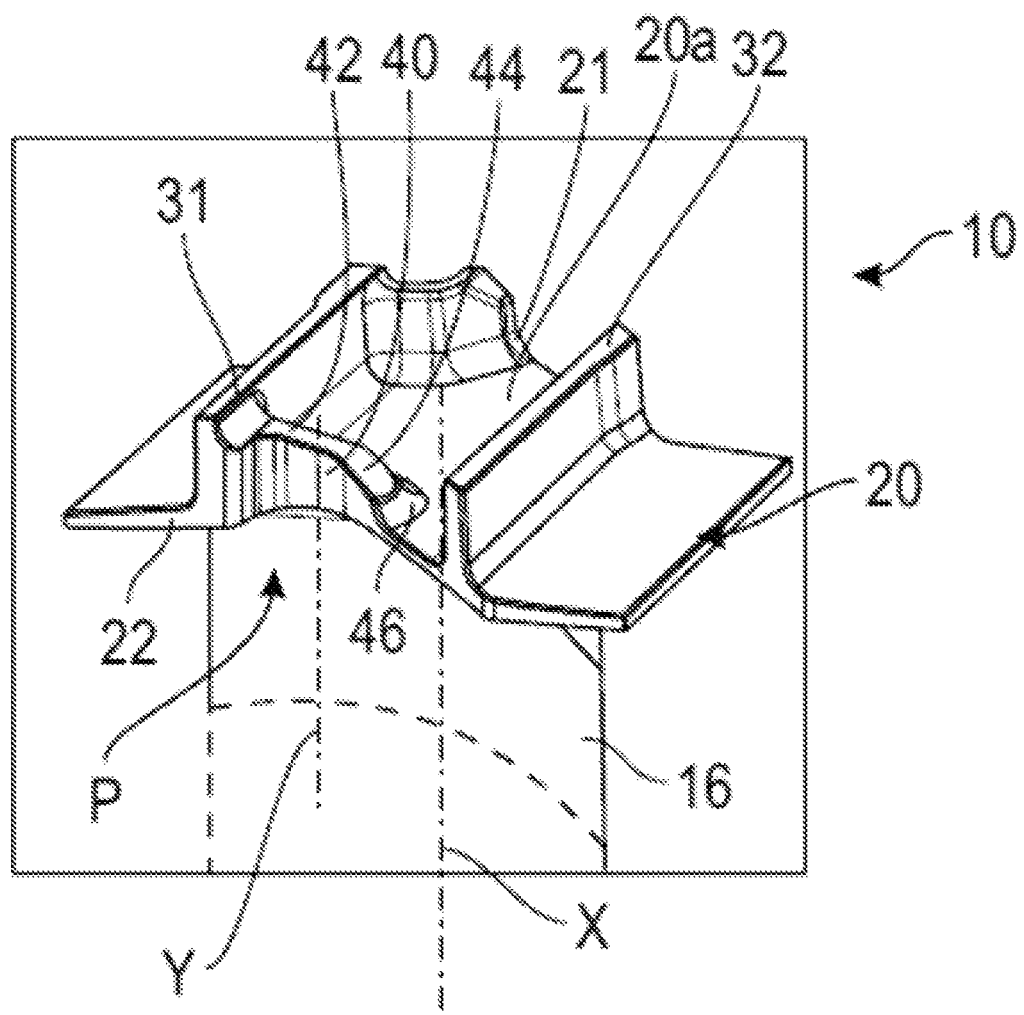
FIG. 4 is a partial schematic perspective view of a rotor vane according to an embodiment of the invention.

The vane 10 in FIG. 4 comprises the characteristics described above with reference to FIGS. 1 and 2.

Figure 5A:
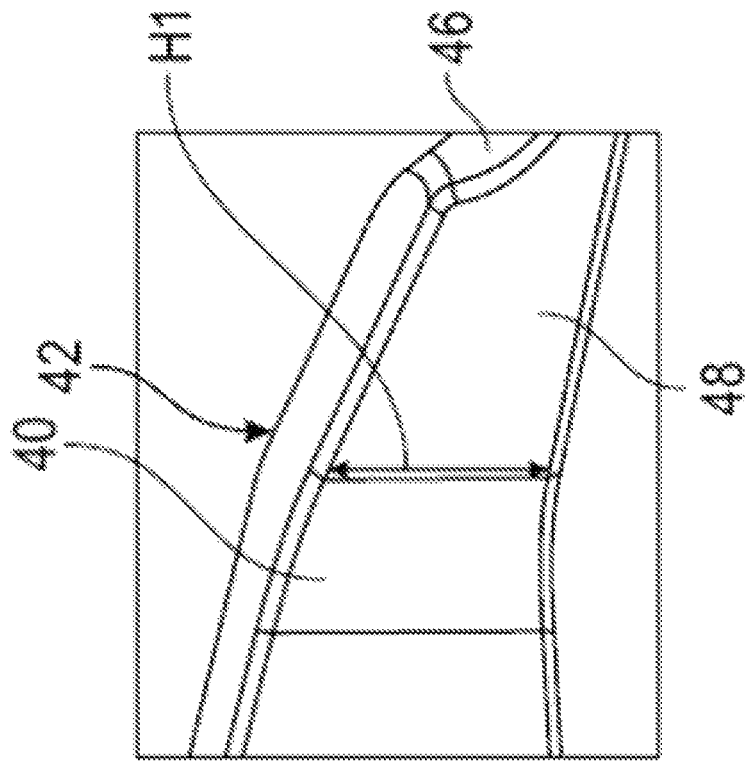
FIGS. 5a to 5d are schematic views of details of the external platform of the vane in FIG. 4.

FIGS. 4 and 5a allow to show the low wall 42 that extends from the wiper 31 to a distance from the wiper 32, along the edge of the hollow tip P.

This low wall 42 comprises a head surface 44, opposite the blade 16, which extends from the wiper 31 and is connected by a first connecting fillet 46 to the surface 20a of the external platform 20 from which the low wall 42 projects. This fillet 46 extends substantially all around the circumference of the low wall.

The hollow tip P comprises the concave cylindrical surface segment 40 formed partly in the external platform 20 and partly in the low wall 42.

Figure 5B:
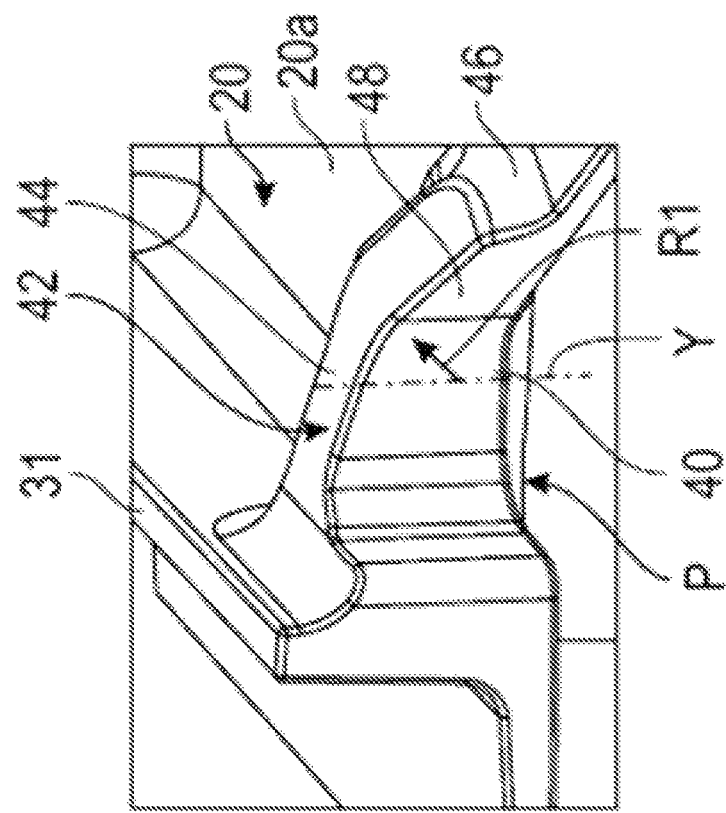

In the example shown and preferred:
the surface segment 40 has a radius R1 that is greater than or equal to 1.2 mm (FIG. 5a), and
the surface segment 40 has a height H1 that is greater than or equal to 3 mm (FIG. 5b).

Figure 5D:
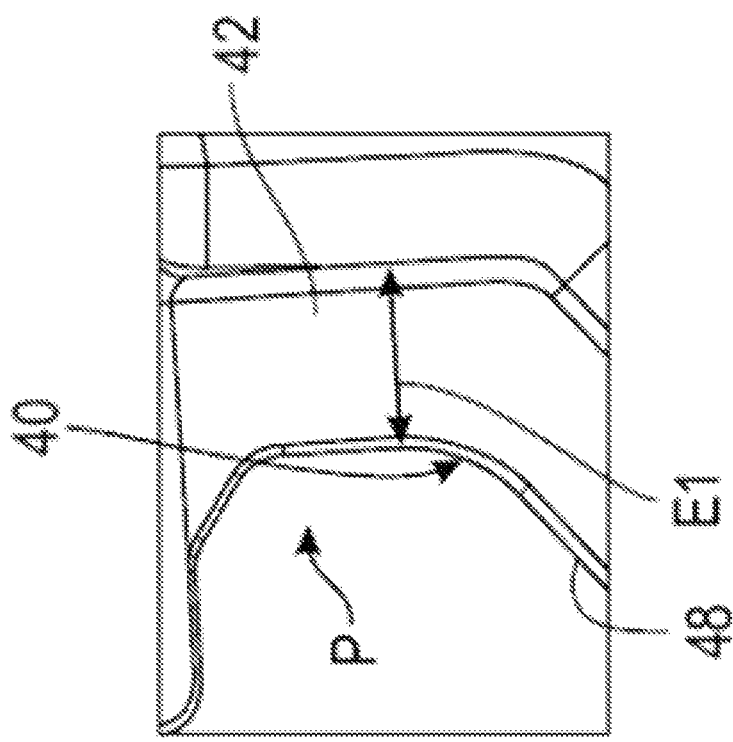

Furthermore, preferably, the low wall 42 has a thickness E1 that is greater than or equal to 2.5 mm (FIG. 5d).

The hollow tip P comprises a second planar surface segment 48 that extends from the first surface segment 40 and is formed partly in the external platform 20 and partly in the low wall 42. This second surface segment 48 extends substantially parallel to the axis Y.

The distance L1 is the cumulative distance of the low wall 42 and the first fillet 46, measured from the first surface segment 40 and along the second surface segment 48.

Figure 5C:
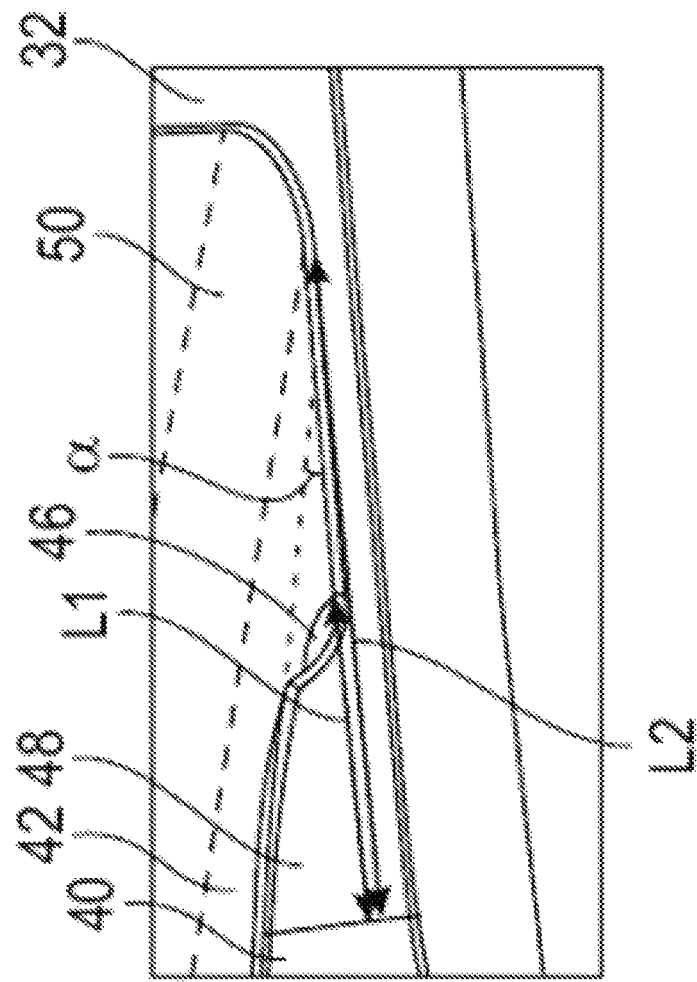

The distance L2 is the cumulative distance from the low wall 42, the first fillet 46 and the second surface 20a of the platform 20 to a second fillet 50 connecting this second surface to the wiper 32 located at a distance from the low wall 42 (FIG. 5c).

The distances L1 and L2 are measured from the first surface segment 40 and along the second surface segment 48. Preferably, the ratio L1/L2 is greater than or equal to 40%.

Furthermore, the head surface 44 of the low wall 42 is preferably inclined with respect to the surface 20a by an angle α less than or equal to 35° (FIG. 5c).

The invention claimed is:

1. A rotor vane for an aircraft turbine engine, the vane having an axis (A) of rotation when secured to a rotor and a stacking axis (X) and comprising a blade extending along the stacking axis between an internal platform and an external platform which bears at least one projecting wiper, said blade comprising an intrados and an extrados and said external platform comprising, on the side of said intrados and extrados, lateral edges configured to cooperate in a form-fitting manner with complementary lateral edges of adjacent vanes, these lateral edges each comprising an anti-wear coating, one of these lateral edges forming a hollow tip (P) comprising a bowl configured to receive said coating and also comprising a first concave cylindrical surface segment formed partly in said external platform and partly in a low wall which projects from this platform and which is connected to said at least one wiper, this first surface segment extending along and about a virtual axis (Y) parallel to said stacking axis (X), wherein:
said low wall has a thickness (E1) measured in a direction perpendicular to said virtual axis (Y), which is greater than or equal to 2.5 mm, and
said first surface segment has a height (H1) measured along said virtual axis (Y), which is equal to at least 150% of the thickness (E1) of the low wall.

2. The vane according to claim 1, wherein said first surface segment has a radius (R1) measured with respect to said virtual axis (Y), which is greater than or equal to 1.2 mm.

3. The vane according to claim 1, wherein said hollow tip (P) comprises a second planar surface segment which extends from said first surface segment on the opposite side of said at least one wiper to which said low wall is connected, the second segment being formed partly in said external platform and partly in said low wall, and extending parallel to said virtual axis (Y).

4. The vane according to claim 3, wherein said external platform comprises a first surface connected to said blade, and a second opposite surface on which said low wall projects, the low wall comprising a head surface, opposite said blade, which extends from said at least one wiper to a first fillet connecting said head surface to said second surface.

5. The vane according to claim 4, wherein said head surface is inclined with respect to said second surface by an angle (a) less than or equal to 35°.

6. The vane according to claim 4, wherein said external platform carries two parallel projecting wipers, said low wall extending from a first one of the wipers to a distance from a second one of the wipers, a cumulative distance (L1) of the low wall and said first fillet, measured from said first surface segment and along said second surface segment, representing at least 40% of a cumulative distance (L2) of the low wall, of said first fillet and of said second surface of the platform to a second fillet connecting the second surface to the second wiper, the distances (L1, L2) being measured from said first surface segment and along said second surface segment.

7. A rotor wheel for an aircraft turbine engine, comprising a disc carrying at its periphery an annular row of vanes according to claim 1.

8. The wheel according to claim 7, wherein the lateral edges of the vanes are nested into one another and comprise anti-wear coatings bearing on one another, the vanes bearing on one another solely by means of the coatings.

9. An aircraft turbine engine, comprising at least one wheel according to claim 7.

10. An aircraft turbine engine, comprising at least one vane according to claim 1.

\* \* \* \* \*